May 15, 1962  W. P. MASON  3,034,345
GAUGES USING PIEZORESISTIVE ELEMENTS
Filed May 19, 1959  2 Sheets-Sheet 1

INVENTOR
W. P. MASON
BY H. O. Wright
ATTORNEY

May 15, 1962  W. P. MASON  3,034,345
GAUGES USING PIEZORESISTIVE ELEMENTS
Filed May 19, 1959  2 Sheets-Sheet 2

INVENTOR
W. P. MASON
BY
H. O. Wright
ATTORNEY

United States Patent Office 3,034,345
Patented May 15, 1962

3,034,345
GAUGES USING PIEZORESISTIVE ELEMENTS
Warren P. Mason, West Orange, N.J., assignor to Bell Telephone Laboratories, Incorporated, New York, N.Y., a corporation of New York
Filed May 19, 1959, Ser. No. 814,288
7 Claims. (Cl. 73—141)

This invention relates to strain gauges, accelerometers and the like. More particularly, it relates to strain gauges, accelerometers and the like employing elements of piezoresistive material as the strain sensitive members.

Devices of the above indicated general type have been heretofore proposed, as disclosed and claimed, for example, in applicant's copending application Serial No. 543,859, filed October 31, 1955, which matured as Patent 2,939,317, granted June 7, 1960, and the copending joint application of J. S. Courtney-Pratt and applicant, Serial No. 794,173, filed February 18, 1959, which matured as Patent 2,963,911 granted December 13, 1960, both assigned to applicant's assignee.

While it has been demonstrated that strain gauges and the like employing piezoresistive elements are from 80 to 150 times as sensitive to strain variations as prior art devices employing simple metallic or metallic alloy elements, the practical use of the newer type of devices has been limited because the piezoresistice elements employed in prior art arrangements have been found to be subject to greater variations of sensitivity to strain with changes in temperature than the older types of elements.

It is, accordingly, a principal object of the present invention to reduce changes in sensitivity resulting from changes in temperature of arrangements employing piezoresistive elements as strain gauges, accelerometers and the like and at the same time to retain a major portion of the enhanced sensitivity of the piezoresistive elements to changes in the strain to which they may be subjected.

The above and other objects and advantages of the present invention are achieved in several specific illustrative preferred embodiments of the invention by employing the piezoresistive elements in a circuit in combination with one or more resistive elements which have predetermined variations of resistance with temperature. The latter are proportioned so that the overall sensitivity of the combination to the strain to be measured is still much greater than that of prior art devices. Moreover, the sensitivity is restricted to small variations over wide ranges of temperature.

Piezoresistive materials of optimum (minimum) resistance versus temperature changes, to be described in detail hereinunder, also constitute a feature of the invention contributing toward the attainment of the superior results. Claims directed to this last mentioned feature are being transferred to or replaced by similar claims in applicant's copending application Serial No. 47,693, filed August 5, 1960, which is a continuation-in-part of the present application.

The above and other features, objects and advantages of the present invention will become apparent during the course of the following detailed description of specific illustrative embodiments of the principles of the present invention illustrated in the accompanying drawings, in which.

Throughout the several figures of the drawings like components are given corresponding designation numbers.

Figure 1:
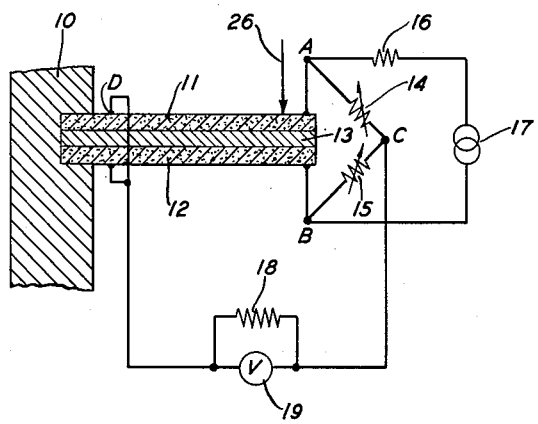
FIG. 1 is illustrative of a first simple specific embodiment of the invention employing two piezoresistive elements.

In more detail in FIG. 1, two like strips 11 and 12 of a piezoresistive material are firmly cemented, as by an epoxy resin, to opposite sides of a strip 13 of resilient nonconductive material such as polystyrene so that strips 11 and 12 are electrically insulated from each other. Alternatively, strip 13 may be of a conductive resilient material such, for example, as steel, Phosphor bronze, "elinvar" (36 percent nickel, 64 percent iron), or the like, provided that the strips 11 and 12 of semiconductive material are insulated from strip 13 (and each other). If metal is employed for strip 13, the alloy known by the trade name "elinvar" (36 percent nickel, 64 percent iron) is preferable in that it has substantially the same coefficient of expansion with changing temperature as silicon and germanium. Consequently, stressing of the semiconductive elements resulting from unequal expansion (or contraction) between metal strip and the semiconductive elements with changes of temperature would not be a serious problem. A layer of cement which holds each piezoresistive element to strip 13 can serve to also insulate the element from strip 13 if of metal. In some instances it may be found satisfactory to omit strip 13 and cement strips 11 and 12 to each other by an interposed layer of insulating cement.

The left end of the composite assembly 11, 12, 13 is firmly held in a recess in a fixed rigid supporting member 10 which can be, for example, of steel. Since as shown in FIG. 1 the left ends of piezoresistive members 11 and 12 are connected electrically together, their junction being designated terminal D, they need not, in the arrangement of FIG. 1, be insulated from member 10. Again, an epoxy resin cement may be employed to hold the end of the composite member 11, 12, 13 firmly in the recess in supporting member 10.

The right ends of piezoresistive members 11 and 12 are electrically connected to the terminals designated A and B, respectively, as shown in FIG. 1. A pair of adjustable electrical resistors 14 and 15 (commonly called potentiometers) are connected in series, their junction being designated terminal C, and this series combination is connected between the above mentioned terminals A and B, as shown. A third resistor 16 is connected in series with a source of electrical energy 17, this combination also being connected to terminals A and B, as shown.

Finally, a fourth resistor 18 is connected in parallel with an indicator 19 which may be, for example, a voltmeter, or in more elaborate arrangements a strip recording indicator, and this parallel combination is connected between the above mentioned terminals C and D, as shown. Resistors 14 and 15 are preferably of constantin or other resistive material which has a substantially constant resistance with changes in temperature. The same applies to resistors 16 and 18 except where they are specifically designed to vary their respective resistances in predetermined manners with temperature to compensate for changes with temperature of the piezoresistive members, as will be described in detail below.

Obviously, the circuit arrangement of FIG. 1 includes a form of the well known Wheatstone bridge, having the four terminals designated A, B, C and D, the piezoresistive members 11 and 12 being two arms of the bridge and resistors 14 and 15 being the other two arms of the bridge. Electrical connections to the appropriate points on the piezoresistive members are preferably made by one of the methods suggested in applicant's above-mentioned joint application.

Arrow 26 indicates that a force, representing a strain or acceleration to be measured, is exerted near and perpendicular to the right end of the composite member 11, 12, 13. This force will, of course, tend to deflect the composite member downwardly, thus stressing members 11 and 12 in opposing sense, i.e. placing member 11 under tension and member 12 under compression.

If with no deflecting force 26 applied to the composite member 11, 12, 13 the adjustable resistors 14 and 15 are adjusted to balance the bridge circuit, the output as indicated by meter 19 will, of course, be zero. When a force such as that represented by arrow 26 is then applied, depending upon the specific piezoresistive material of which members 11 and 12 are made, as will be described in detail hereinunder, one of the members 11 and 12 will have increased resistance and the other decreased resistance. The bridge, therefore, will no longer be balanced and a reading indicative of the magnitude of the force applied will appear on meter 19. The differential effect of the "bimorph" formed by binding members 11 and 12 together and flexing the combination so as to stress the members 11 and 12 in opposing sense, i.e. to subject one to tension and the other to compression, of course, amplifies the difference between their respective resistances for any particular strain and produces a correspondingly greater unbalance of the bridge circuit and a larger reading on the meter in the output circuit. To this point the operation thus far described is essentially that of the arrangement described in applicant's above-mentioned sole application in connection with FIG. 5 of that application. In view of the common subject matter as just described, the present application is a continuation-in-part of applicant's above-mentioned prior sole application.

As long as the bridge is balanced and no force 26 is applied, regardless of how the temperature changes the bridge will remain balanced since the resistances of the two like piezoresistive members 11 and 12 will change in like manner with temperature changes. (This assumes, of course, that changes with temperature, if any, of resistors 14 and 15 are similar so that they also maintain the balance of the bridge.)

However, if a change in temperature occurs and a predetermined magnitude of the force 26 is then applied, the degree of unbalance caused in the bridge circuit and the corresponding reading of meter 19 will differ from those which would have resulted had the temperature remain unchanged and had the same predetermined magnitude of the force been applied. This is obviously so since for the piezoresistive elements the change in resistance for a given strain will in generally vary inversely as the absolute temperature T.

It can be shown that the output voltage as read on meter 19 is proportional to the change in resistance "$\Delta R$" of the piezoresistive elements as expressed in the relation:

$$V_0 = i_0 R_{18} = \frac{E_0\left(\frac{\Delta R}{R_0}\right)}{\left(1+\frac{R_0}{R_{18}}\right)+\left(\frac{R_{16}}{R_0+R_{18}}\right)} \quad (1)$$

where $E_0$ is the voltage applied to the bridge;
$V_0$ is the output voltage;
$i_0$ is the output current;
$R_{16}$ is the resistance of resistor 16;
$R_{18}$ is the resistance of resistor 18;
$R_0$ is the initial resistance of each bridge element at a "normal" temperature $T_0$; and
$\Delta R$ is the resistance change due to strain of each piezoresistance bridge element.

Accordingly, assuming the elements other than the piezoresistive elements remain relatively constant with temperature, the output current for any given value of applied strain will decrease in inverse proportion to the absolute temperature as a result of changes in the strain sensitive part of the resistances of the piezoresistive elements with temperature.

The changes in the voltage output with changes in temperature can be neutralized or compensated for by appropriate concurrent changes in the resistance of either or both of the resistors 16 and 18 so that the reading obtained on meter 19 for any predetermined force 26 will not change appreciably with changes in temperature over a wide range of temperatures. It is necessary, therefore, to fabricate either or both of the resistors 16 and 18 of a material which will change its resistance with temperature in proportion to the above-mentioned change in output so that the reading of meter 19 will remain constant with a constant applied force 26 irrespective of variations in the temperature.

One arrangement, which is simple and effective, is to make the resistance of the input resistor 16 large compared with the resistances of the other resistors in the circuit (for example, $R_{16}$ can be made from ten to one hundred times greater than the other resistors). The voltage of source 17 can then be appropriately increased to provide the same voltage output sensitivity as before. (This is in essence providing what is known in the art as a "constant current source" for the bridge.) It can then be shown that the following relation is valid, the symbols being as defined above in connection with relation 1.

$$V_0 = \frac{E_0}{R_{16}}\left(\frac{\Delta R}{R_0}\right)(R_0+R_{18}) \quad (2)$$

As mentioned above, $R_{16}$ can be made of constantin or some other material having a substantially constant resistance irrespective of its temperature. If this is done, the quantity $(R_0+R_{18})$ must be increased in proportion to the absolute (Kelvin) temperature to compensate for the corresponding decrease in the quantity $$\left(\frac{\Delta R}{R_0}\right)$$

Assuming, by way of specific illustrative example, that it is desired to operate over the temperature range between minus 100 degrees centigrade (173 degrees Kelvin) and plus 100 degrees centigrade (373 degrees Kelvin), the temperature ratio using absolute or Kelvin temperatures is $$\frac{373}{173}$$

or substantially 2.16.

From any standard handbook on metals it may be ascertained that over the above temperature range the common metals listed in the table below will vary in resistivity by the ratios listed in the second column adjacent the respective materials. The third column of the table below is the resistivity ratio divided by the above-mentioned temperature ratio and is obviously a measure of the change of resistivity per degree for the specific material with which it is associated.

| Material | Resistivity Ratio | Resistivity Ratio/Temperature Ratio |
|---|---|---|
| Aluminum | 2.52 | 1.17 |
| Copper | 2.52 | 1.17 |
| Iron | 2.81 | 1.3 |
| Nickel | 3.06 | 1.42 |
| Zinc | 2.76 | 1.28 |

From the above table it is obvious that nickel will produce the largest compensating effect and from general considerations it would probably be the most convenient to use. It should be noted, however, that it would be entirely feasible to use any of the materials given in the table, as well as a large number of other metals and alloys well known and extensively used by those skilled in the art.

Assuming that, by way of example, nickel is to be used and that exact compensation is desired at the extreme temperatures of the above mentioned range (i.e. at 173 degrees Kelvin and 373 degrees Kelvin, with 273 degrees Kelvin being the midpoint of the temperature range), noting from the handbook that the resistivities of nickel at the extreme temperatures of the range are 3.63 and 11.0, respectively, and assuming a nominal bridge resistance of 100 ohms, which can be maintained substantially constant by means described hereinabove, the following relation is obtained:

$$\left(\frac{273}{173}\right)[100+X(3.63)]=\left(\frac{273}{373}\right)[100+X(11.0)] \quad (3)$$

where 173 and 373 are the limiting absolute (or Kelvin) temperatures of the range, 273 is the median absolute temperature of the range, 3.63 and 11.0 are the resistivities for nickel at the extreme temperatures of the range, respectively, 100 is the bridge resistance in ohms, and X is the factor by which the resistivity should be multiplied at any specific temperature to ascertain the appropriate resistance of $R_{18}$ at that temperature if it be of nickel. Solving for X we obtain the value 36.4. At the median absolute temperature the resistivity of nickel is 6.93 so that $R_{18}$ should have a resistance of 36.4 times 6.93 or 252 ohms if made of nickel. At the median temperature, the compensated value of resistance is found to be 3.5 percent low with respect to the values at the extreme temperatures of the range. This corresponds to an accuracy of ±1.75 percent over the entire range. For a more restricted range the accuracy can, of course, be made correspondingly greater. For example, over such a relatively narrow range as 13 to 44 degrees centigrade, commonly accepted as the "room temperature range," an accuracy of a fraction of one percent can be realized.

Since the greatest "power sensitivity" occurs when the terminating resistance is equal to the bridge resistance, the above-described arrangement represents a power loss of four decibels. However, where, as in the present instance, it is the value of the indicated voltage which is significant, the above-described arrangement represents a gain over the above-mentioned ideal termination (judged ideal solely from the viewpoint of power). A smaller power loss can be realized if the resistance of resistor 16 is made to decrease as the temperature increases. This can be achieved by using a carbon or titanuim resistor. However, since it is a relatively simple and economical matter to increase the voltage and power furnished by source 17, for most purposes it will be satisfactory to simply make resistor 16 large and relatively constant as suggested hereinabove.

Figure 5:
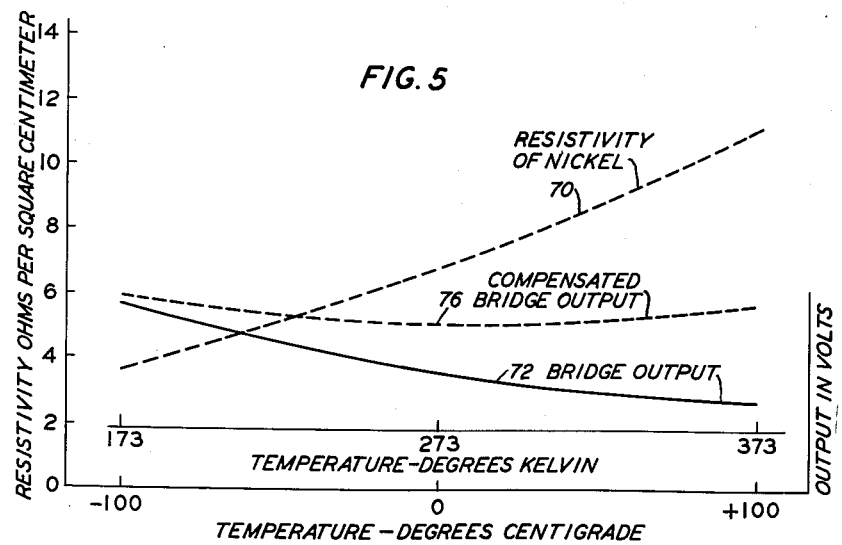
FIG. 5 comprises curves illustrative of the temperature compensating method of the invention.

In FIG. 5, curve 70 represents the change in resistivity of nickel over the above indicated wide range of temperature. Curve 72 represents the change in bridge voltage output without the compensating effect of the nickel resistor $R_{18}$, i.e. where a constant resistance $R_{18}$ is used. Curve 76 represents the compensated bridge voltage output.

For higher temperature ranges such materials as molybdenum disulphide which goes under the trade name of "Kanthal," has a larger change of resistance with temperature and can stand a higher temperature.

Greater sensitivity than that obtainable by the arrangement of FIG. 1 can be obtained by appropriate use of four like piezoresistive elements or members connected and arranged to constitute all four arms of the bridge. The sensitivity is thus increased by a factor of two. One arrangement of this type is illustrated in FIG. 2.

Figure 2:
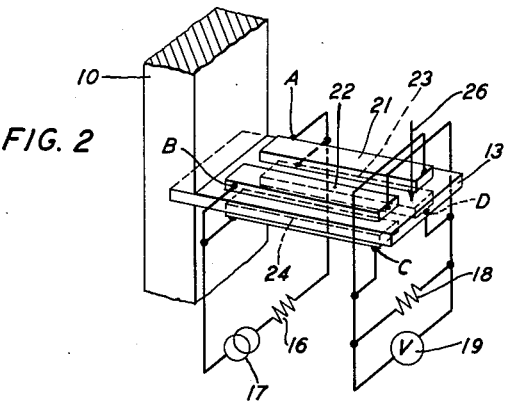
FIG. 2 is illustrative of a second specific embodiment of the invention including four elements of piezoresistive material.

In FIG. 2, four like piezoresistive elements or members 21, 22, 23 and 24 are employed. Two of these elements 21, 22 are mounted in spaced relation on the upper surface of strip 13. The longitudinal axes of strips 21 and 22 are parallel to the longitudinal axis of strip 13 and symmetrically arranged with respect to the longitudinal axis of strip 13. Elements 23 and 24 are symmetrically mounted on the underside of strip 13, element 23 being opposite and parallel to element 21 and element 24 being opposite and parallel to element 22. The left end of strip 13 is firmly held in a recess in the rigid fixed supporting member 10.

The four piezoresistive elements or members 21 through 24 are then interconnected to constitute the four arms of a Wheatstone bridge as shown in FIG. 2. The circuit is more readily perceived when shown in wholly electrical schematic diagram form as in FIG. 4 where resistors 21', 22', 23' and 24' represent the resistances of the correspondingly numbered elements 21 through 24, respectively, of FIG. 2. Elements 16 through 19, inclusive, are of course common to FIGS. 1 through 4, inclusive, and are as described for FIG. 1. In FIG. 4 the four arms of the bridge are rearranged in the conventional equivalent form of the "lattice structure" which is well known and widely used by those skilled in the art as a somewhat more convenient way of schematically representing a four-arm Wheatstone bridge.

As shown in both FIGS. 2 and 4, a source of electrical energy 17 and a resistor 16 are connected in series between bridge terminals A and B and the combination of meter 19 shunted by resistor 18 is connected between bridge terminals C and D, as shown.

The arrangement of FIG. 2 is thus seen to be essentially similar to that of FIG. 1 except that potentiometers 14 and 15 are replaced by piezoresistive elements, as shown.

The piezoresistive elements 21 through 24, inclusive, of FIG. 2 are selected so that they all have the same electrical resistance so that when no deflecting force is applied to strip 13 the bridge circuit formed by them will be balanced and therefore no potential difference will be observed across terminals C and D and meter 19 will read zero.

Upon the application of a deflecting force 26 as indicated near the right end of strip 13, FIG. 2, however, the upper pair of elements will be stressed in opposite sense to the lower pair of elements, i.e. the pair of elements or members 21 and 22 will be placed in tension and the pair of elements or members 23 and 24 will be placed in compression. Accordingly, the resistances of one pair will be increased and the resistances of the other pair will be decreased thus unbalancing the bridge circuit and causing a reading to appear on meter 19, the magnitude of which will be proportional to the magnitude of the applied force 26. Force 26, of course, can represent a strain or an acceleration to be measured. As indicated above in connection with FIG. 1, one or both of the resistors 16 and 18 can be arranged to change resistance with variation of temperature to compensate for changes in "ΔR," the strain sensitive part of the resistance of elements 21 through 24, inclusive, with the variation in temperature as described hereinabove.

Figure 3:
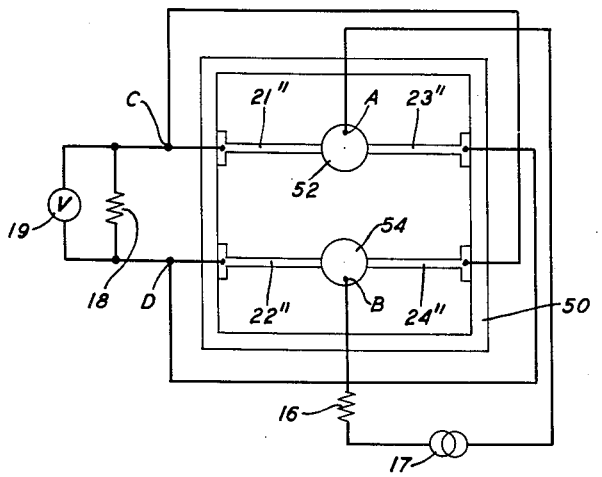
FIG. 3 is illustrative of a third specific embodiment of the invention intended primarily for use as an accelerometer.
Figure 4:
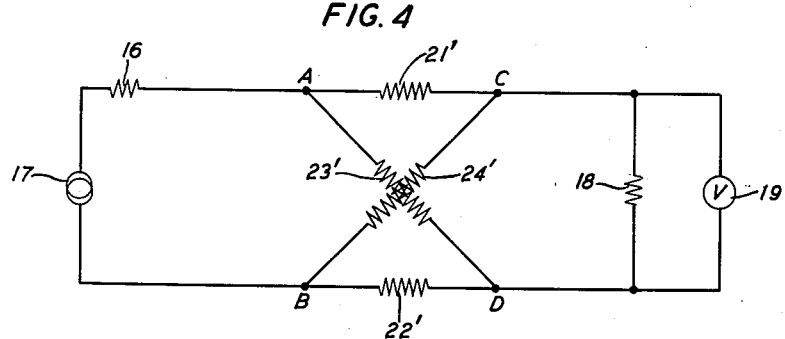
FIG. 4 is a wholly electrical schematic diagram of an overall circuit of the invention which is essentially the circuit embodied in the arrangements of the previous figures.

A third specific illustrative embodiment of the principles of the invention is indicated in FIG. 3 and represents an application of the principles of the invention to an accelerometer of a type similar to one disclosed and claimed in applicant's above-mentioned joint application with J. S. Courtney-Pratt.

In order to have available four piezoresistive members to serve as the four arms of a bridge circuit, two identical complex piezoresistive members are employed (instead of one as in applicant's joint application), each member consisting of a central mass 52 or 54, respectively, and each mass having a pair of oppositely extending leg portions 21" and 23" for the upper member and 22" and 24" for the lower member as shown in FIG. 3. Each mass and its associated pair of legs are preferably cut as an integral unit from a single crystal of the piezoresistive material as taught in the copending joint application. Connections to the central mass portions can constitute terminals A and B, respectively, of the bridge, and the electrically cross-connected ends of the opposite legs of the two members can be interconnected to constitute terminals C and D of the bridge as shown in FIG. 3. The other portions of the circuit of FIG. 3 obviously are identical with the correspondingly numbered portions of the circuits of FIGS. 1 and 2. The overall circuit of FIG. 3, obviously, also can be represented in wholly electrical schematic diagram form by the diagram of FIG. 4 where the resistances of legs 21″ through 24″ of FIG. 3 are represented by resistances 21′ through 24′, respectively, of FIG. 4. An alternate arrangement is to have one piezoresistive accelerometer unit, i.e. one mass with a pair of oppositely directed leg portions, and to have the balancing resistances constituting the other two arms of the bridge of constantin or other constant resistance material, as in FIG. 1. This will result in a simpler structure but will only be half as sensitive as that of FIG. 3.

In the arrangement of FIG. 3, in accordance with the teaching of applicant's above-mentioned joint application, the inertias of the central masses 52, 54 when accelerated toward the right will cause the legs extending toward the left to be stressed oppositely with respect to the legs extending toward the right, i.e. legs 23″, 24″ will be placed under tension and legs 21″, 22″ will be placed under compression. Where frame 50 is rigidly attached to a vehicle, therefore, the reading of meter 19 will provide an indication of the acceleration in the direction of the axes of the leg members to which the vehicle is being subjected. Initially, of course, the bridge is balanced by making the resistances of all four of the legs 21″ through 24″ equal. Compensation for the effects of temperature changes upon the piezoresistive members or elements preferably is introduced as described above for other embodiments of the invention.

In all of the above-described specific illustrative embodiments and numerous and varied other arrangements within the spirit and scope of the principles of the invention which can readily be devised by those skilled in the art, the piezoresistive elements or members can be of silicon, germanium, indium antimonide, gallium arsenide, silicon carbide, aluminum antimonide, aluminum arsenate, aluminum phosphide, gallium antimonide, gallium phosphide, indium arsenate and probably many other materials.

While polycrystalline elements will work, greater sensitivity will be obtained, as mentioned above, if each piezoresistive element is cut from a single crystal, the longitudinal axis of the element being oriented with respect to the crystallographic axes of the crystal in such manner that the maximum piezoresistive effect is obtained from the specific element. Preferred orientations, in terms of the conventional Miller Crystallographic Indices, are given, for example, in applicant's above-mentioned copending joint application for silicon and germanium of either p or n conductivity types.

As a still further refinement, the piezoresistive material can be modified advantageously by the introduction of specified amounts of specific impurities. For example, the introduction of a specified amount of boron into silicon will result in the p-type of conductivity and can effect a substantial stabilization of its resistance with temperature variations. Likewise, a specified amount of phosphorus introduced into silicon will result in the n-type of conductivity and can make its resistance much more stable with temperature variations. Other "impurity" elements of valence 3 can be used to obtain p-type silicon or germanium whereas other "impurity" elements of valence 5 can be used to obtain n-type silicon or germanium. For the classes III and V, i.e. for materials which have valences of 3 and 5, respectively, including compounds such as gallium arsenide, et cetera, p-type elements can be obtained by using elements of valence 2 such as zinc, while n-type results from the use of elements of valence 4 which combines with the 5 valence part of the compound to give a donor impurity, or by the use of materials having a valence of 6.

Obviously, if the individual piezoresistive members or elements can be made to have highly stable resistance with temperature variations, the combinations of two or more piezoresistive members in combinations such as the specific illustrative embodiments of FIGS. 1, 2 and 3 will likewise have highly stable resistance characteristics. Furthermore, although the bridge remains balanced for no force applied if the temperature of all of the elements is the same, a small temperature difference between two or more of the piezoresistive elements of the bridge can unbalance the bridge, unless the change in resistance with temperature is small.

As one example of a preferred piezoresistive material for use in combinations of the invention from the standpoint of stability of its resistance with changes in temperature, silicon containing substantially 1 times $10^{19}$ atoms per cubic centimeter of boron or phosphorus has been found to vary only slightly in resistance over a wide range of temperatures centered about the so-called room temperature range. For temperature climates and in buildings which are heated during the colder months of the year, the normal range of room temperatures is usually considered to be between 55 and 110 degrees Fahrenheit (13 to 44 degrees centigrade).

Since p-type silicon has the greater sensitivity to variations in the strain to which it is subjected, an optimum piezoresistive material for use in the combinations of the invention is currently considered to be silicon with 1.16 times $10^{19}$ atoms of boron per cubic centimeter. This material will vary in resistance by substantially ±1.5 percent over the temperature range of minus 73 degrees centigrade to plus 100 degrees centigrade, i.e. from minus 100 degrees Fahrenheit to plus 212 degrees Fahrenheit. Good stability is obtained for boron or phosphorus additions from 3 times $10^{18}$ to 5 times $10^{19}$ atoms per cubic centimeter. While all of these degrees of "doping," i.e. quantities of the added impurity, are not quite as stable with temperature changes as the preferred value, they are all sufficiently stable for many purposes.

Where extreme sensitivity and accuracy are not required, indeed, a single element of silicon containing substantially 1.16 times $10^{19}$ atoms of boron per cubic centimeter can be used as a strain gauge or pressure gauge in a simple series circuit between a source of electrical energy and an indicating means as the prior art metallic or metallic alloy gauges are sometimes employed. Obviously, also, a single piezoresistive element can be incorporated in a bridge circuit the remaining three arms of which are simple resistors of constantin, and the circuit arrangements can be otherwise substantially as shown in FIG. 1, described in detail above, for example. The differential effect of a "bimorph" structure would of course be sacrificed by the use of only one piezoresistive element.

In general, for silicon and germanium an element for use in structures of the present invention should be cut from a single crystal with its longitudinal axis oriented parallel to a [111] direction (Miller indices). An exception is n-type silicon for which the most sensitive direction is the [100] direction. Elements of p-type conductivity silicon or germanium have resistances which increase with the application of tension and decrease with compression. Elements of n-type conductivity have resistances which decrease with the application of tension and increase with compression.

The above and numerous and varied modifications and rearrangements within the spirit and scope of the invention will readily occur to those skilled in the art. The above-described specific embodiments are merely illustrative of preferred arrangements for practicing the principles of the invention.

1. The combination which comprises a source of electrical energy, an output circuit comprising a voltmeter and a resistor connected electrically in parallel with the voltmeter, an intermediate circuit comprising a Wheatstone bridge electrically interconnecting the source and the output circuit, two arms of the bridge being identical piezoresistive elements the resistances of which vary with mechanical strain and the sensitivities of which vary inversely with the absolute temperature, the piezoresistive elements being in adjacent arms of the bridge and being mounted on opposite sides of an elongated resilient member, the member being firmly held at one end only, the resistor in the output circuit having a resistance which varies directly with the absolute temperature and which is proportioned to compensate for variations of the voltage in the output circuit resulting from variations of the sensitivity of the piezoresistive elements with temperature changes, whereby when a force is applied normal to the free end of the elongated resilient member, the two piezoresistive elements will be stressed, one in tension, the other in compression, and variations of the sensitivities of the piezoresistive elements with temperature will be compensated by the change in the effective sensitivity of the voltmeter resulting from the change in the resistance of the output circuit resistor.

2. The comibnation of claim 1 in which all four arms of the Wheatstone bridge are identical elongated elements of piezoresistive material, two piezoresistive elements being mounted symmetrically on one surface of the elongated resilient member with their longitudinal axes parallel to that of the resilient member, the other two piezoresistive elements being mounted in corresponding positions on the opposite surface of the resilient member, the first two elements being connected in opposite arms of the bridge circuit, the second two elements being connected in the remaining two opposite arms of the bridge circuit, whereby flexing of the elongated resilient member by application of a force normal to its free end will stress the piezoresistive elements, two in tension and two in compression, and the resulting degree of unbalance of the bridge circuit for a specific applied force will be double that of a comparable bridge circuit in which only two arms are of piezoresistive material one being stressed in tension and the other in compression.

3. In combination, an elongated strip of resilient material having two oppositely disposed major surfaces, a fixed support rigidly holding an end of the strip, a first pair of like elongated piezoresistive elements symmetrically mounted with respect to the longitudinal axis of the strip on one major surface of the strip and electrically insulated therefrom, the elements being spaced and electrically insulated from each other, a second pair of elongated piezoresistive elements substantially identical to the first piar and mounted in identical manner on the opposite major surface of the strip, means electrically interconnecting the four piezoresistive elements as a four-armed Wheatstone bridge circuit, the piezoresistive elements of each pair being connected in opposite arms of the bridge circuit, respectively, a source of electrical energy, the source being connected across a pair of diagonally opposite terminals of the bridge, a voltmeter, the voltmeter being connected in parallel across the other terminals of the bridge, in which the sensitivity of the piezoresistive elements varies inversely with changes in the absolute temperature and the voltmeter is shunted by a resistor which changes its resistance in direct proportion to the absolute temperature, the resistance being proportioned to compensate, by changing the effective sensitivity of the voltmeter, for the changes in sensitivity of the four piezoresistive elements.

4. The combination of claim 3 in which the resistor is of nickel.

5. The combination of claim 1 in which the piezoresistive elements are of a material selected from the class consisting of silicon, germanium, indium antimonide, gallium arsenide, silicon carbide, aluminum antimonide, aluminum arsenate, aluminum phosphide, gallium antimonide, gallium phosphide and indium arsenate.

6. The combination of claim 1 in which the resistor is of nickel.

7. The combination of claim 3 in which the piezoresistive elements are of a material selected from the class consisting of silicon, germanium, indium antimonide, gallium arsenide, silicon carbide, aluminum antimonide, aluminum arsenate, aluminum phosphide, gallium antimonide, gallium phosphide and indium arsenate.

References Cited in the file of this patent
UNITED STATES PATENTS

| | | |
|---|---|---|
| 2,558,563 | Janssen | June 26, 1951 |
| 2,614,416 | Hollmann | Oct. 21, 1952 |
| 2,672,048 | Ruge | Mar. 16, 1954 |
| 2,716,216 | Gollub | Sept. 4, 1956 |